(12) United States Patent
Kresl et al.

(10) Patent No.: US 10,310,724 B2
(45) Date of Patent: Jun. 4, 2019

(54) SELF-SERVICE VISUALIZATION OF AUTOMATION SYSTEMS

(71) Applicant: Iconics, Inc., Foxborough, MA (US)

(72) Inventors: Vojtech Kresl, Plzen (CZ); Ivo Zeleny, Plzen (CZ); Miroslav Kocanek, Plzen (CZ); Russell L. Agrusa, Westwood, MA (US)

(73) Assignee: Iconics, Inc., Foxborough, MA (US)

( * ) Notice: Subject to any disclaimer, the term of this patent is extended or adjusted under 35 U.S.C. 154(b) by 221 days.

(21) Appl. No.: 15/190,408

(22) Filed: Jun. 23, 2016

(65) Prior Publication Data
US 2016/0378323 A1    Dec. 29, 2016

Related U.S. Application Data

(60) Provisional application No. 62/185,360, filed on Jun. 26, 2015.

(51) Int. Cl.
| | | |
|---|---|---|
| *G06F 3/048* | (2013.01) | |
| *G06F 3/0484* | (2013.01) | |
| *G06F 3/0482* | (2013.01) | |
| *G06F 3/0486* | (2013.01) | |
| *G05B 19/00* | (2006.01) | |
| *G06F 9/44* | (2018.01) | |

(52) U.S. Cl.
CPC ........ *G06F 3/04847* (2013.01); *G05B 19/00* (2013.01); *G06F 3/0482* (2013.01); *G06F 3/0486* (2013.01); *G06F 9/44* (2013.01)

(58) Field of Classification Search
CPC ....................................... G06F 3/048
See application file for complete search history.

(56) References Cited

U.S. PATENT DOCUMENTS

| | | | |
|---|---|---|---|
| 2011/0009984 A1* | 1/2011 | Mukhi | G05B 23/0267 700/83 |
| 2016/0179359 A1* | 6/2016 | Kodejs | G06F 3/0481 715/763 |

\* cited by examiner

*Primary Examiner* — Xuyang Xia

(74) *Attorney, Agent, or Firm* — Goodwin Procter LLP

(57) ABSTRACT

Systems and methods for creating real-time, on-the-fly visualization interfaces for automated systems are described. A graphical user interface allows a user to associate real-time data from one or more automated systems with a graphical interface control. The graphical interface control allows the user to interact with the automated system in real-time to make adjustments to its current state or to visualize real-time streaming data.

14 Claims, 3 Drawing Sheets

SELF-SERVICE VISUALIZATION OF AUTOMATION SYSTEMS

CROSS-REFERENCE TO RELATED APPLICATION

This application claims priority to and the benefit of U.S. Provisional Patent Application 62/185,360, filed on Jun. 26, 2015, and entitled "Self-Service Visualization of Automation Systems," the entirety of which is incorporated by reference herein.

TECHNICAL FIELD OF THE INVENTION

The present disclosure relates generally to graphical user interfaces and, more particularly, to systems and methods for dynamic visualization of automation systems.

BACKGROUND

Existing interfaces for automation systems are limited in that they require, among other things, pre-configuration of displays and HMI (Human/Machine Interface)/SCADA (Supervisory Control and Data Acquisition) systems, static configuration of the visualization screens, and time consuming connection of data to interface widgets.

Current interfaces do not allow users to create custom, on-the-fly visualizations for manipulating automated systems. A user must individually adjust HMI/SCADA systems as there are no platforms able to seamlessly integrate controls for various automated systems within the same facility or network of facilities.

There is a need for a platform to provide a seamless, dynamic interface for a user to control automated systems within a facility's operational control process (OPC) environment in real-time.

SUMMARY OF THE INVENTION

The systems and methods for creating real-time, on-the-fly visualization interfaces for automated systems that we describe here may encompass one or more of the following (and other) aspects, features and implementations, and combinations of them.

In general, in an aspect, a computer-implemented method is provided. The method provides an application, including a graphical user interface for constructing a visualization of one or more automated system components while real-time control data associated with the one or more automated system components is received by the application. The method associates, by the application, a graphical user interface control with a real-time control data source, the real-time control data source including a stream of real-time control data for a particular automated system component. The method finally displays, by the application, the stream of real-time control data using the graphical interface control.

In some embodiments, the graphical user interface includes a canvas, a data selection panel, and a graphical interface control selection panel. The canvas may include an area into which one or more graphical interface controls can be placed. The data selection panel may include an interface for selecting, by a user, one of a number of real-time control data sources to be at least one of placed on the canvas and associated with a graphical user interface control on the canvas. The graphical user interface control panel may include an interface for selecting, by a user, one of a number of graphical user interface controls to be placed on the canvas.

In some embodiments, the method receives a selection of the graphical interface control by the user from the graphical interface control selection panel, displays the graphical interface control on the canvas, and receives a selection of the real-time control data source, by a user, from the data selection panel. The real-time control data source may be at least partially compatible with the graphical interface control.

In some embodiments, the method receives a selection of the real-time control data source, by a user, from the data selection panel, places the real-time data control source on the canvas, and receives a selection of the graphical interface control for display on the canvas. The selection may be based on a compatibility of the graphical interface control with the real-time control data source. In this embodiment, the graphical interface control is a first graphical interface control, with the method also receiving a selection of a second graphical interface control that may be at least partially compatible with the real-time control data source; associating, by the application, the real-time control data source with the second graphical interface control; and displaying, by the application, the stream of real-time control data using the second graphical interface control instead of the first graphical interface control.

In some embodiments, the method also includes filtering graphical interface controls in the graphical interface control selection panel based on compatibility of each graphical interface control with a particular real-time control data source.

In some embodiments, the method includes receiving a user interaction with the graphical interface control and causing the particular automated system component to be manipulated based on the user interaction with the graphical interface control. The method may also include saving the visualization to a storage medium.

In another aspect, a system is provided for creating real-time, on-the-fly visualization interfaces for automated systems. The system includes a first processor and a first memory in electrical communication with the first processor. The first memory includes instructions that can be executed by a processing unit including the first processor or a second processor, or both. The processing unit may be in electrical communication with a memory module that includes the first memory or a second memory, or both.

The instructions program the processing unit to provide an application including a graphical user interface for constructing a visualization of one or more automated system components while real-time control data associated with the one or more automated system components is received by the application; associate, by the application, a graphical interface control with a real-time control data source, the real-time control data source including a stream of real-time control data for a particular automated system component; and display, by the application, the stream of real-time control data using the graphical interface control.

In some embodiments, the graphical user interface of the system includes a canvas, a data selection panel, and a graphical interface control selection panel. The canvas may include an area into which one or more graphical interface controls can be placed. The data selection panel of the system may include an interface for selecting, by a user, one of a number of real-time control data sources to be at least one of placed on the canvas and associated with a graphical user interface control on the canvas. The graphical user interface control panel of the system may include an interface for selecting, by a user, one of a number of graphical user interface controls to be placed on the canvas.

In some embodiments, the system operations include receiving a selection of the graphical interface control by the user from the graphical interface control selection panel, displaying the graphical interface control on the canvas, and receiving a selection of the real-time control data source, by a user, from the data selection panel. The real-time control data source may be at least partially compatible with the graphical interface control.

In some embodiments, the system operations also include receiving a selection of the real-time control data source, by a user, from the data selection panel, placing the real-time data control source on the canvas, and receiving a selection of the graphical interface control for display on the canvas. The selection may be based on a compatibility of the graphical interface control with the real-time control data source. In this embodiment, the graphical interface control is a first graphical interface control, with the system operations also including receiving a selection of a second graphical interface control that is at least partially compatible with the real-time control data source; associating, by the application, the real-time control data source with the second graphical interface control; and displaying, by the application, the stream of real-time control data using the second graphical interface control instead of the first graphical interface control.

In some embodiments, the operations also include filtering graphical interface controls in the graphical interface control selection panel based on compatibility of each graphical interface control with a particular real-time control data source.

In some embodiments, the operations include receiving a user interaction with the graphical interface control and causing the particular automated system component to be manipulated based on the user interaction with the graphical interface control. The operations may also include saving the visualization to a storage medium.

BRIEF DESCRIPTION OF THE FIGURES

In the drawings, like reference characters generally refer to the same parts throughout the different views. In the following description, various embodiments of the present invention are described with reference to the following drawings in which.

DETAILED DESCRIPTION

The invention relates generally to methods and systems for creating real-time, on-the-fly visualization interfaces for automated systems. In one implementation, a system for dynamically creating a visualization and control interface provides a graphical user interface that allows a user to create and configure controls for, and interact with, one or more automated systems. When references are made herein to an "automated system" or "automated systems" it is meant broadly to include, for example, monitoring and controlling processes, which can include controlling equipment (such as valves and gauges) in an automated factory or process line, the operation of power plants, water treatment facilities, heating, air conditioning and ventilation ("HVAC") systems. Embodiments of the invention can be used in activities that involve the interactions of humans with control processes and systems, for example, in nursing homes, in amusement park rides, and even in prisons. Embodiments of the invention can also be used to monitor and manage operations in a discrete manufacturing environment, where data or events result in the generation and use of digital signals.

Figure 1:
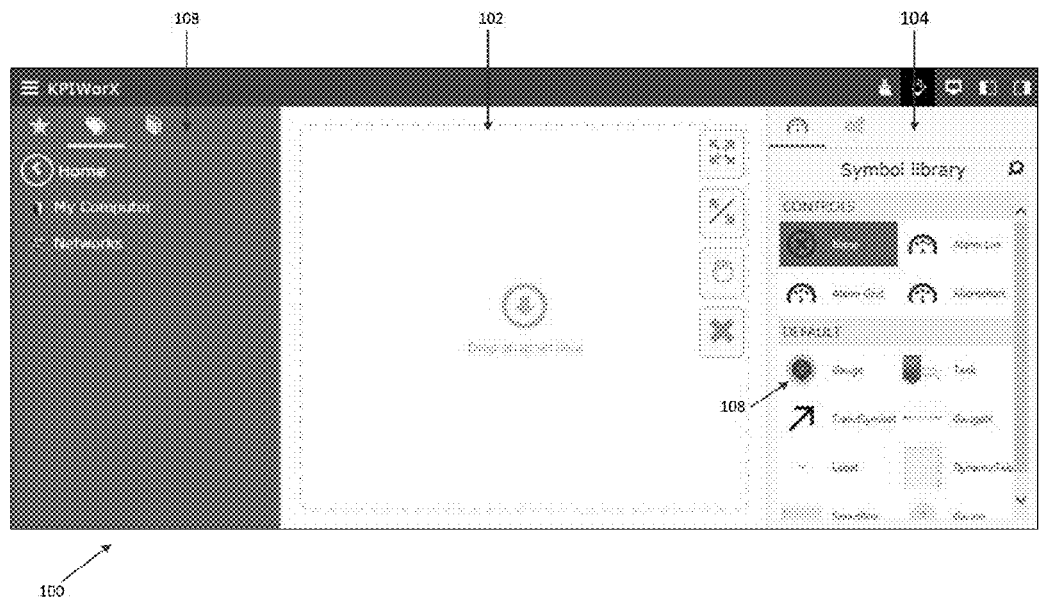
FIG. 1 is an example of a graphical user interface for dynamically creating an interface to control one or more automated systems in real-time.

The graphical user interface may include three sections, as shown in FIG. 1. Specifically, in the depicted implementation, the graphical user interface 100 includes canvas 102, graphical interface control panel 104, and data selection panel 106. Graphical interface control panel 104 contains a symbol library, which contains a number of symbols 108. Each different symbol 108 may represent a different manner of measurement or visual representation of data associated with an automated system component. For example, symbols 108 in the symbol library may include a gauge, a tank, and an arrow to represent a trend. Data selection panel 106 displays sources of data received from one or more automated system components. This data may be updated in real-time. The automated systems may be connected to a facility's operational process control (OPC) server.

Figure 2:
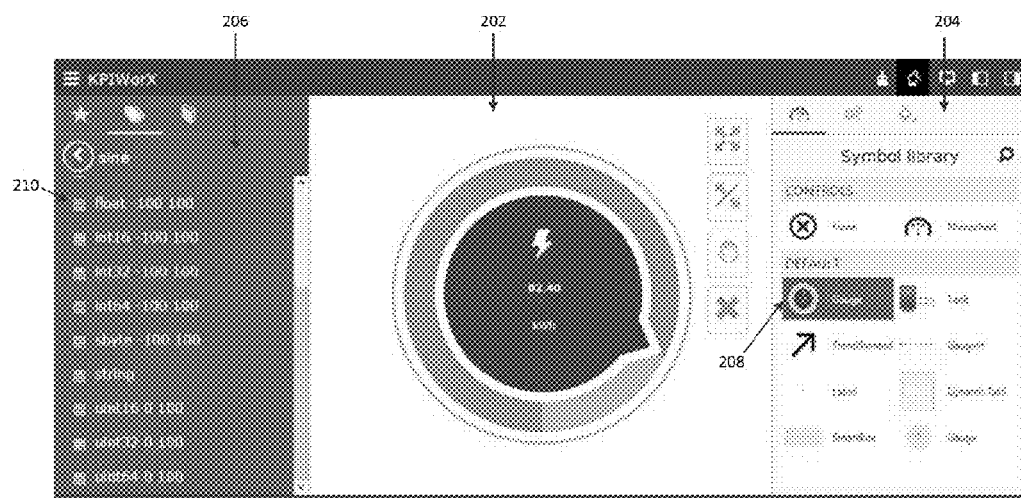
FIG. 2 provides a specific example of a graphical user interface with a user dynamically controlling an automated system.

As depicted in FIG. 2, a user may select one of either a symbol 208 or a data source 210 from the data selection panel 206 and drag the item onto the canvas 202. The user then may select a symbol 208 from the graphical control panel 204 and drag it on top of the icon for the selected data source 210 to bind the automated system component represented by the data source 210 with the symbol 208, to allow the user to view data received from the automated system component and manipulate the automated system component in real-time.

If the user first selected a data source 210 from the data selection panel 206 and dragged the data source 210 to the canvas 202, the user may then select a symbol 208 from the graphical control panel 204. In some embodiments, selecting a data source 210 may cause certain symbols 206 to fade or otherwise be filtered out, indicating that they are not compatible with the selected data source 210. An example may be if a user selects a data source 210 containing the current temperature measured by a thermostat, then the symbol depicting a tank would fade, indicating that it is inactive and not compatible with thermostat data. Similarly, a user may choose to drag a symbol 208 to the canvas 202 first and data sources 210 that may not be manipulated by this type of symbol 208 may fade or otherwise be filtered out, and may not allow the user to select them if they are not compatible with the selected symbol 208.

When both the symbol 208 from the graphical interface control panel 204 and a data source 210 from the data selection panel 206 are present in the canvas 202, the data source 210 and the symbol 208 map to each other and connect to the automated system component associated with the data source 210. This automated system may be part of a facility's larger operational process control environment. Once the data source 210 is associated with a symbol 208, the user may manipulate the symbol 208, for example a gauge, to adjust the corresponding automated system component (e.g., thermostat) in real-time using the facility's OPC server.

The user may create grid layouts on the canvas 202 to manipulate multiple data sources at once and may save various visualizations. For certain automated systems, the user may view a real-time data feed from the automated systems' components. Additionally, data sources may be re-bound to different symbols. For example, if a particular data source is on the canvas and associated with a gauge symbol, the user may simply drag a new symbol over the data source-symbol combination to change the gauge symbol to the new symbol. In this way, the canvas is a dynamic environment in which the user may visualize multiple data sources associated with automated systems and their components in real-time. For example, the user may replace the gauge symbol which shows a current temperature reading with a chart symbol that shows the temperature over a period of time.

Figure 3:
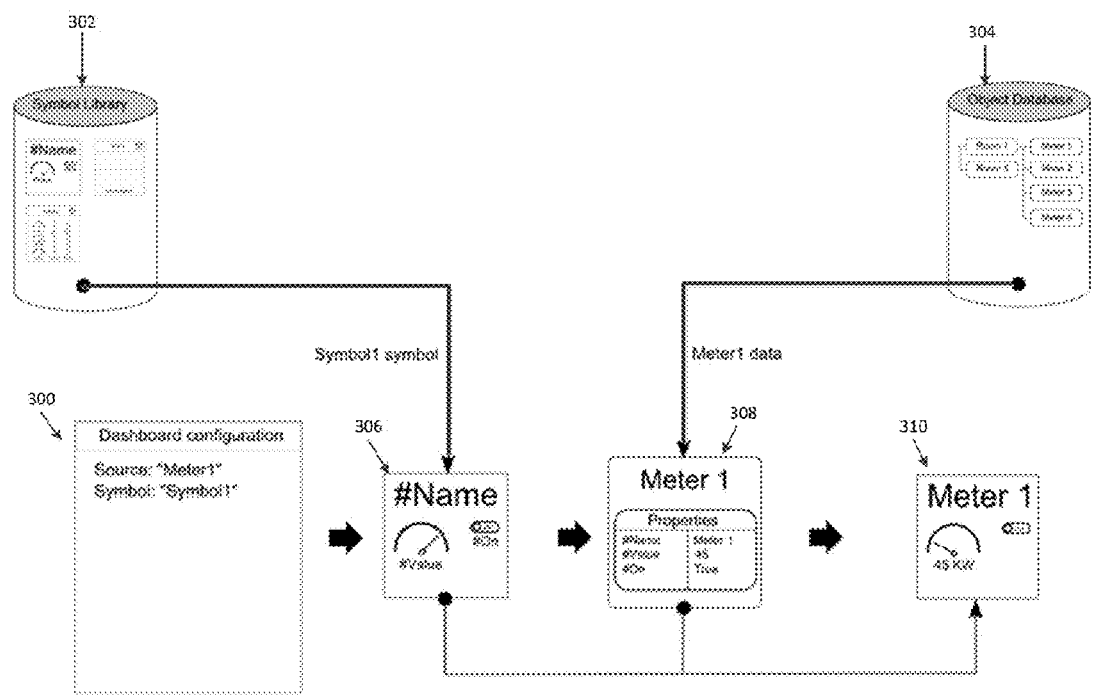
FIG. 3 is a schema of one embodiment of a system to provide a graphical user interface for controlling, by a user, one or more automated systems.

FIG. 3 shows an example schema of a system for dynamically creating visualization and control interface. A user may select a data source, such as "Meter1" 308 and a symbol, such as "Symbol1" 306. When both are present on the canvas, which may also be referred to as the dashboard 300, a look-up is performed in each respective database for each symbol and source. The Object Database 304 can be stored in or otherwise accessible to an OPC server and may be hierarchically organized by room and object type depending on the facility. The symbol may be stored in a Symbol Library 302 on a storage medium also accessible to the OPC server. The system receives the Meter1 308 object and the Symbol1 306 object. The Symbol1 306 object may include various parameters to which the Meter1 properties can be mapped, such as a graphical gauge that can display a measured value, an on/off value, and a name. The system associates the Meter1 308 and Symbol1 306 objects, so that the user sees Symbol1 306 displayed on the canvas with the properties of Meter1 308, such as the measured value of 45 KW, the switch status of On, and the name "Meter 1" (depicted as visualization control 310).

Figure 4:
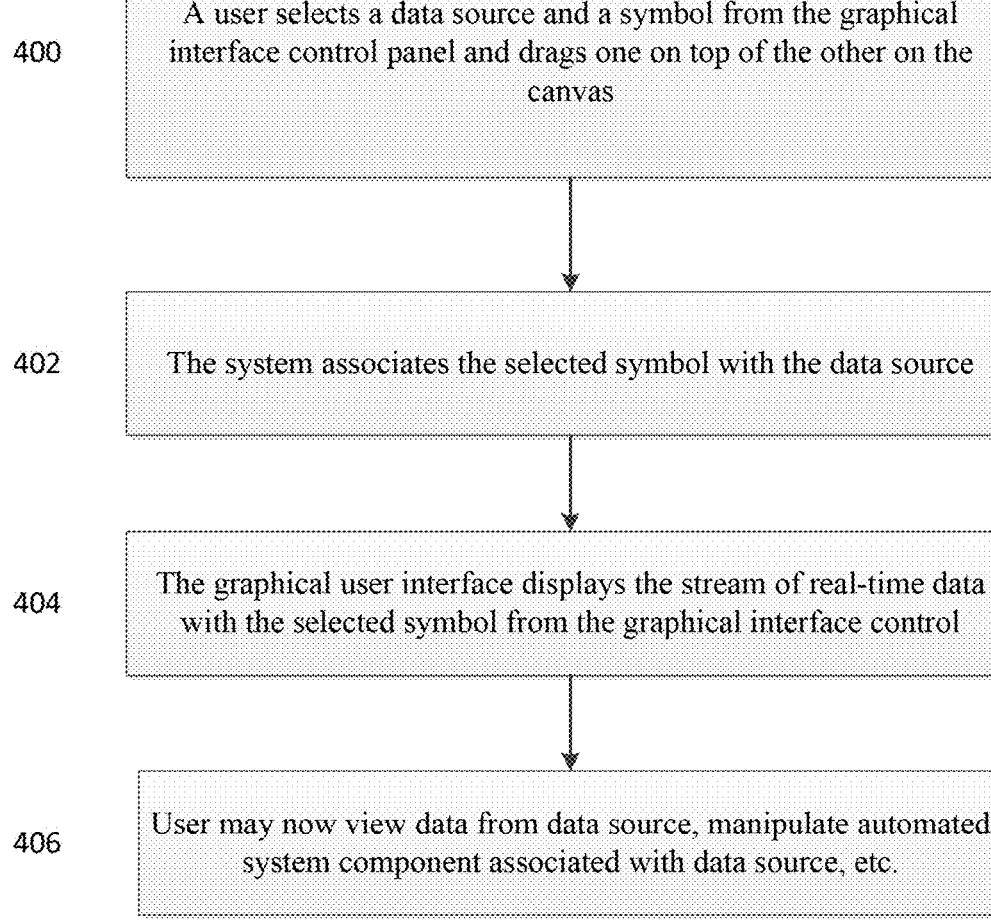
FIG. 4 depicts a flow chart of an example method for dynamically creating an interface to control an automated system.

FIG. 4 depicts a flow chart of a user creating a visualization and control interface for an automated system component using the graphical user interface. The user selects a data source and drags the data source onto the canvas (400). The symbols which are not compatible with the selected data source may fade or otherwise be filtered out, indicating that they have become inactive because they may not be selected by the user. The user selects a symbol and drags the symbol on top of the data source icon on the canvas to associate the data source to the symbol (400). As previously described, the system retrieves data associated with the selected symbol from the symbol library and retrieves a data stream and any other stored data related to the selected data source from the object database. The system then maps the symbol to the data source (402). The symbol may now display relevant information received from the OPC server and provided via the data source, such as the automated system component's current reading, historical measurements, or current data stream (404). At this point the user may view data streaming in real-time from the data source, manipulate the automated system component via the graphical user interface, or choose to change how the data source is visualized by selecting a new symbol from the graphical interface control panel, among other actions (406).

The techniques described herein may be implemented in any appropriate hardware or software. If implemented as software, the processes can execute on a system capable of running one or more commercial operating systems such as the Microsoft Windows® operating systems, the Apple OS X® operating systems, the Apple iOS® platform, the Google Android™ platform, the Linux® operating system and other variants of UNIX® operating systems, and the like. Such a system can include, for example, a workstation, a smart or dumb terminal, network computer, smartphone, tablet, laptop, palmtop, wireless telephone, television, gaming device, music player, mobile telephone, information appliance, personal digital assistant, wireless device, minicomputer, mainframe computer, or other computing device, that is operated as a general purpose computer or a special purpose hardware device that can execute the functionality described herein. Generally, the software can be implemented on a general purpose computing device in the form of a computer including a processing unit, a system memory, and a system bus that couples various system components including the system memory to the processing unit.

The software architecture of the visualization system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework. The visualization system and associated components can be implemented as native applications, web applications, or other form of software. In some implementations, a particular application is in the form of a web page, widget, and/or Java, JavaScript, .Net, Silverlight, Flash, and/or other applet or plug-in that is downloaded to a user device and runs in conjunction with a web browser. An application and a web browser can be part of a single client-server interface; for example, an application can be implemented as a plugin to the web browser or to another framework or operating system. Any other suitable client software architecture, including but not limited to widget frameworks and applet technology can also be employed.

Clients and servers executing the described functionality can communicate with each other through a communications network. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network can carry TCP/IP protocol communications and HTTP/HTTPS requests made by a web browser, and the connection between clients and servers can be communicated over such TCP/IP networks. The type of network is not a limitation, however, and any suitable network can be used.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assources (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
    providing an application comprising a graphical user interface for constructing a visualization of one or more automated system components while real-time control data associated with the one or more automated system components is received by the application, wherein the graphical user interface comprises a canvas, a data selection panel, and a graphical interface control selection panel;
    associating, by the application, a first graphical interface control with a real-time control data source, the real-time control data source comprising a stream of real-time control data for a particular automated system component, wherein the associating comprises:
        receiving a selection of the real-time control data source by a user from the data selection panel;
        placing the real-time control data source on the canvas;
        receiving a selection of the first graphical interface control by the user from the graphical interface control selection panel, the selection of the first graphical interface control being based on a compatibility of the first graphical interface control with the real time control data source; and
        placing the first graphical interface control on the canvas to bind the first graphical interface control to the real-time control data source, thereby forming an interface control-data source combination on the canvas;
    displaying, by the application, the stream of real-time control data using the first graphical interface control;
    receiving a user interaction with a second graphical interface control, wherein the second graphical interface control is at least partially compatible with the real-time control data source, and wherein the user interaction comprises a movement of the second graphical interface control by the user from the graphical interface control selection panel to the canvas and on top of the interface control-data source combination;
    in response to the user interaction, associating, by the application, the real-time control data source with the second graphical interface control instead of the first graphical interface control, thereby forming an updated interface control-data source combination on the canvas; and
    displaying, by the application, the stream of real-time control data using the second graphical interface control.

2. The method of claim 1, wherein the canvas comprises an area into one or more graphical interface controls can be placed.

3. The method of claim 1, wherein the data selection panel comprises an interface for selecting, by the user, one of a plurality of real-time control data sources to be placed on the canvas and associated with a graphical interface control on the canvas.

4. The method of claim 1, wherein the graphical interface control panel comprises an interface for selecting, by the user, one of a plurality of graphical interface controls to be placed on the canvas.

5. The method of claim 1, further comprising filtering graphical interface controls in the graphical interface control selection panel based on compatibility of each graphical interface control with a particular real-time control data source.

6. The method of claim 1, further comprising:
    receiving a user interaction with the first graphical interface control; and
    causing the particular automated system component to be manipulated based on the user interaction with the first graphical interface control.

7. The method of claim 1, further comprising saving the visualization to a storage medium.

8. A system comprising:
    at least one memory for storing computer-executable instructions; and
    at least one processing unit for executing the instructions, wherein execution of the instructions programs the at least one processing unit to perform operations comprising:
        providing an application comprising a graphical user interface for constructing a visualization of one or more automated system components while real-time control data associated with the one or more automated system components is received by the application, wherein the graphical user interface comprises a canvas, a data selection panel, and a graphical interface control selection panel;
        associating, by the application, a first graphical interface control with a real-time control data source, the real-time control data source comprising a stream of real-time control data for a particular automated system component, wherein the associating comprises:

receiving a selection of the real-time control data source by a user from the data selection panel;

placing the real-time control data source on the canvas;

receiving a selection of the first graphical interface control by the user from the graphical interface control selection panel, the selection of the first graphical interface control being based on a compatibility of the first graphical interface control with the real-time control data source; and placing the first graphical interface control on the canvas to bind the first graphical interface control to the real-time control data source, thereby forming an interface control-data source combination on the canvas;

displaying, by the application, the stream of real-time control data using the first graphical interface control;

receiving a user interaction with a second graphical interface control, wherein the second graphical interface control is at least partially compatible with the real-time control data source, and wherein the user interaction comprises a movement of the second graphical interface control by the user from the graphical interface control selection panel to the canvas and on top of the interface control-data source combination;

in response to the user interaction, associating, by the application, the real-time control data source with the second graphical interface control instead of the first graphical interface control, thereby forming an updated interface control-data source combination on the canvas; and displaying, by the application, the stream of real-time control data using the second graphical interface control.

9. The system of claim 8, wherein the canvas comprises an area into one or more graphical interface controls can be placed.

10. The system of claim 8, wherein the data selection panel comprises an interface for selecting, by the user, one of a plurality of real-time control data sources to be placed on the canvas and associated with a graphical interface control on the canvas.

11. The system of claim 8, wherein the graphical interface control panel comprises an interface for selecting, by the user, one of a plurality of graphical interface controls to be placed on the canvas.

12. The system of claim 8, wherein the operations further comprise filtering graphical interface controls in the graphical interface control selection panel based on compatibility of each graphical interface control with a particular real-time control data source.

13. The system of claim 8, wherein the operations further comprise:

receiving a user interaction with the first graphical interface control; and causing the particular automated system component to be manipulated based on the user interaction with the first graphical interface control.

14. The system of claim 8, wherein the operations further comprise saving the visualization to a storage medium.

* * * * *